(No Model.)

D. H. HOLLINGSWORTH.
SHEARS.

No. 521,526. Patented June 19, 1894.

Witnesses
Geo. Wadman
John M. Daily

Inventor
Daniel H. Hollingsworth,
By his attorney,
Philip J. O'Reilly.

UNITED STATES PATENT OFFICE.

DANIEL H. HOLLINGSWORTH, OF BROOKLYN, NEW YORK.

SHEARS.

SPECIFICATION forming part of Letters Patent No. 521,526, dated June 19, 1894.

Application filed November 8, 1893. Serial No. 490,340. (No model.)

*To all whom it may concern:*

Be it known that I, DANIEL H. HOLLINGSWORTH, of the city of Brooklyn, county of Kings, and State of New York, have invented a new and useful Improvement in Shears, of which the following is a specification.

This invention relates to shears.

My object is to provide shears which will be cheap to manufacture, durable in use, and so constructed as to be operated equally well by right or left handed persons, and adapted not to injuriously affect the hand of the operator by prolonged use.

Figure 1:
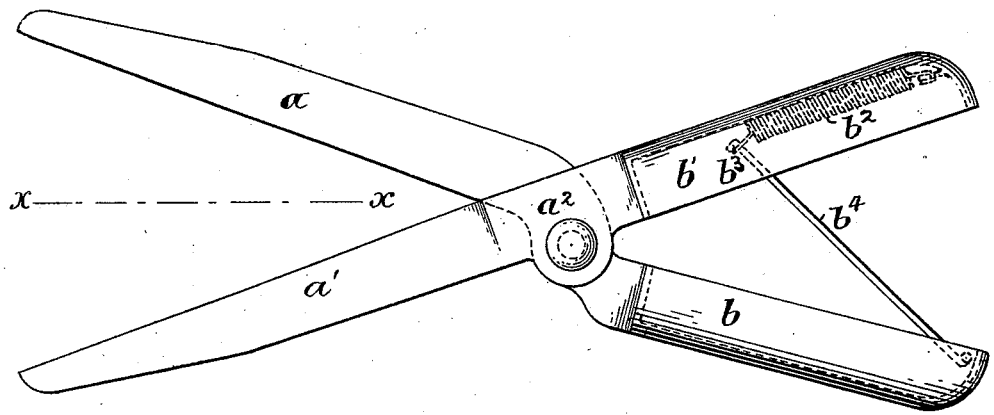
Figure 2:

In the accompanying drawings, Figure 1 is a top view of a pair of shears constructed according to my invention, and Fig. 2 is a side view thereof.

$a, a'$ designate two ordinary cutting blades pivotally connected together at a point, $a^2$, arranged in a line extending laterally at right angles to the central longitudinal line of opening (indicated by the dotted line $x\ x$) of the blades. Preferably this pivotal connection of the blades will be at, or adjacent to, a line coinciding with the cutting edge of one of the blades. The blades may be pivoted together in any suitable manner.

$b, b'$, designate the respective handles of the blades, $a\ a'$, and consist of approximately semi-circular hollow shells open toward each other and having their meeting sides in line radially with the pivot, $a^2$. One of these handles is provided with a coil spring, $b^2$, secured at one end to the extremity of the handle, and looped at its other end, $b^3$, to the free end of a bar, $b^4$, pivoted to the extremity of the other handle.

The handles may be kept closed temporarily by means of a rubber band or suitable catch device, and, if desired, their top and bottom meeting edges may be depressed, thereby forming concaved surfaces extending lengthwise of the handles.

I claim—

A pair of shears having each of its blades provided with a hollow handle and a spring secured in the hollow of one of the handles and connecting with a bar pivoted in the hollow of the other handle, one of said blades having a perforated ear projecting from one side out of line with the cutting edge, and the other blade provided with an opening in line with the cutting edge and a pivot passed through the said openings to hold the plates assembled.

DANIEL H. HOLLINGSWORTH.

Witnesses:
PHILIP J. O'REILLY,
JOHN M. DAILY.